United States Patent
Fernandez et al.

(10) Patent No.: US 8,504,322 B2
(45) Date of Patent: Aug. 6, 2013

(54) LIKELIHOOD MAP SYSTEM FOR LOCALIZING AN EMITTER

(75) Inventors: Andrew David Fernandez, San Jose, CA (US); David Gines, Fort Collins, CO (US); Robert Thomas Cutler, Everett, WA (US); Dietrich Werner Vook, Los Altos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 371 days.

(21) Appl. No.: 12/326,020

(22) Filed: Dec. 1, 2008

(65) Prior Publication Data

US 2010/0138184 A1 Jun. 3, 2010

(51) Int. Cl.
*G01C 9/00* (2006.01)
(52) U.S. Cl.
USPC ............................................. 702/150
(58) Field of Classification Search
USPC ................. 702/150; 342/174; 340/686.1
See application file for complete search history.

(56) References Cited

U.S. PATENT DOCUMENTS

2004/0022214 A1* 2/2004 Goren et al. .................. 370/332
2006/0267833 A1* 11/2006 Langford et al. ............. 342/174

OTHER PUBLICATIONS

Orhan et al., Jun. 15, 2011, International Symposium on Innovations in Intelligent Systems and Applications—INISTA, 2011, "Epilepsy Diagnosis Using Probability Density Functions of EEG Signals".*

* cited by examiner

*Primary Examiner* — Tung S Lau
*Assistant Examiner* — Xiuquin Sun

(57) ABSTRACT

A system and a method for displaying an emitter location are disclosed. The system includes a plurality of receivers at different locations in a field. Each receiver generates a receiver signal that depends on the magnitude of a signal from the emitter. The system also includes a processor that receives the receiver signal and generates a likelihood map indicative of an approximation of a probability as a function of position in the field of the emitter location. The likelihood map includes a plurality of receiver maps. Each receiver map includes a probability as a function of position in the field of the emitter location based on the signal magnitude for at least one of the receiver signals. Each receiver map may depend on a ratio of the signal magnitudes from a corresponding pair of the receivers, or on one of the signal magnitudes from a corresponding one of the receivers.

19 Claims, 5 Drawing Sheets

LIKELIHOOD MAP SYSTEM FOR LOCALIZING AN EMITTER

BACKGROUND OF THE INVENTION

There are a number of applications where it is desirable to be able to identify an unknown location of an object, which emits a signal. One example occurs when planning an indoor wireless local area network (LAN) having one or more RF or microwave emitters. Of course precisely defining an object's location requires specifying coordinates in three dimensions (e.g., longitude, latitude, and altitude). In the discussion to follow, for simplicity of explanation it is assumed that the third coordinate (i.e., altitude) is either known or is otherwise easily determined once the other two coordinates (e.g., latitude and longitude) are identified. Those skilled in the art will be able to extrapolate the discussion to follow to the case where all three coordinates are to be determined.

There are a few known methods to locate signal emitters using a plurality of distributed sensors, or receivers, which are spaced apart from each other. Among the most common of these methods are: Time Difference of Arrival (TDOA), Time of Arrival (TOA), Angle of Arrival (AOA), and Received Signal Strength (RSS). The TDOA method, also known sometimes as multilateration or hyperbolic positioning, is a process of locating an emitter by accurately computing the time difference of arrival of a signal emitted from the emitter at three or more sensors. In particular, a signal emitted from a signal emitter will arrive at slightly different times at two spatially separated sensor sites, the TDOA being due to the different distances to each sensor from the emitter. For given locations of the two sensors, there is a set of emitter locations that would give the same measurement of TDOA. Given two known sensor locations and a known TDOA between them, the locus of possible locations of the signal emitter lies on a hyperbola. In practice, the sensors are time synchronized and the difference in the time of arrival of a signal from a signal emitter at a pair of sensors is measured. With three or more sensors, multiple hyperbolas can be constructed from the TDOAs of different pairs of sensors. The location where the hyperbolas generated from the different sensor pairs intersect is the most likely location of the signal emitter. In the TOA method, a signal emitter transmits a signal at a predetermined or known time. Three or more sensors each measure the arrival time of the signal at that sensor. The known time of arrival leads to circles of constant received time around each sensor. The locations where the circles from the three or more sensors intersect are the most likely location of the signal emitter.

In the AOA method, the angle of arrival of the signal is measured with special antennas at each receiver. This information is combined to help locate the signal emitter.

In the RSS method, the power of the received signal at each sensor is measured, and this information is combined to help locate the signal emitter. A number of different emitter location procedures employ RSS. For example, one commonly used method in planning indoor wireless LAN systems in a building of interest is to map the received signal strength at various locations around the building during a setup phase. From this map, a variety of algorithms can be used to locate the signal emitter based on computed received power at three or more sensors. With at least three sensors using the TOA or RSS methods, three such circles are generated, and the location of the emitter can be found where the three circles intercept. With at least 3 sensors using the TDOA method, three hyperbolas are generated, and the location of the emitter can be found at the intersection of the hyperbolas.

Each of these methods is subject to errors arising from the finite accuracy of the measurements. With many sensors, it is possible to increase the accuracy by determining the point where most of the generated circles intersect. However, the addition of measurement uncertainty and noise makes this a difficult problem to solve analytically with a high degree of accuracy. Moreover, with existing equipment, it is often difficult for a troubleshooter to easily and efficiently view all of the relevant data of interest to allow a clear picture of any coverage and interference issues. More robust data analysis and data presentation capabilities are needed.

SUMMARY OF THE INVENTION

The present invention includes a system for displaying a location of an emitter, and a method for using the same. The system has a plurality of receivers at different locations in a field in which the emitter is located. Each receiver generates a receiver signal characterized by a signal magnitude that depends on an magnitude of a signal from the emitter. The system also has a processor that receives the receiver signals and generates a likelihood map indicative of an approximation of a probability of the emitter location as a function of position in the field. The likelihood map includes a plurality of receiver maps. Each receiver map includes a probability as a function of position in the field of the emitter location based on the signal magnitude for at least one of the receiver signals. In one embodiment, each of the receiver maps depends on a ratio of the signal magnitudes from a corresponding pair of the receivers. In another embodiment, each of the receiver maps depends on one of the signal magnitudes from a corresponding one of the receivers.

DETAILED DESCRIPTION OF THE PREFERRED EMBODIMENTS OF THE INVENTION

Figure 1:
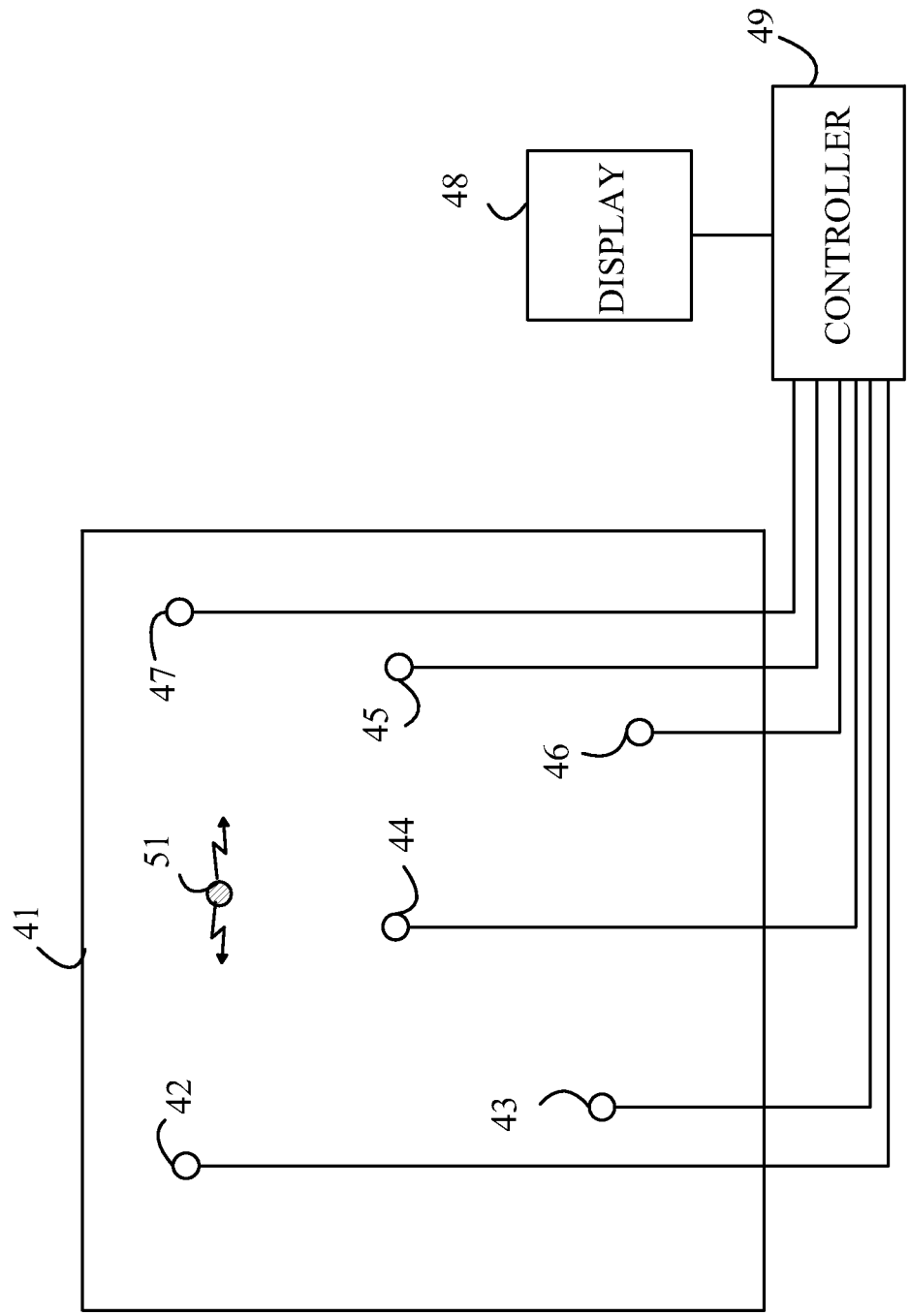
FIG. 1 is a simplified block diagram of a system according to one embodiment of the invention.

The manner in which the present invention provides its advantages can be more easily understood with reference to the location of an emitter using the received signal strength method. Refer now to FIG. 1, which illustrates a system for locating an emitter 51 that moves within a field of view 41. It will be assumed that the emitter is an RF emitter; however, other forms of emitters could be utilized. The field of view is monitored by a plurality of receivers 42-47 that receive the signals transmitted by emitter 51. The receiver signals are processed by a controller 49 that measures the strength of each signal as received by each receiver, and optionally, the time of arrival of each signal at each emitter. While the controller is shown as a separate discrete processor, it should be noted that the controller may be distributed with a portion embedded in each sensor. The manner in which the controller processes signals from the receivers will be discussed in more detail below.

The controller utilizes this data to generate a likelihood map that is used to estimate the location of the emitter in field of view 41. The controller can make the determination automatically by processing the likelihood map and/or displaying the likelihood map on display 48 so that a user can make the determination.

In general, the received power from an RF emitter falls off as a function of distance from the emitter according to $$P = K_0 r^{-n} \quad (1)$$

Here, $K_0$ is a constant. The value of n in free space is 2; however, for indoor or dense urban environments, n may be between 3 and 4.

Consider a system in which two receivers receive signals from the emitter. Denote the distance from the first receiver to the emitter by $r_1$ and the distance from the second receiver to the emitter by $r_2$. Then the ratio of signal powers received by the two receivers is $$P_1/P_2 = (r_2/r_1)^n \quad (2)$$

It can be shown that the power ratio defines a circle of a given radius centered on a line that runs between the two receivers and that the emitter must lie within that circle. This circle is often referred to as the "Circle of Apollonius". If there are more than 2 receivers, the ratio of the power received by each pair of receivers defines one such circle, and the emitter must lie at the intersection of all of the circles. For N receivers, there are N!/(2(N-2)!) circles. In the absence of measurement errors, three receivers uniquely define the location of the receiver. However, an error in measuring the received power, signal path traversed, and path loss exponent, n, make a unique solution difficult. For example, errors in n can result in a set of circles that do not all intersect.

Figure 2A:
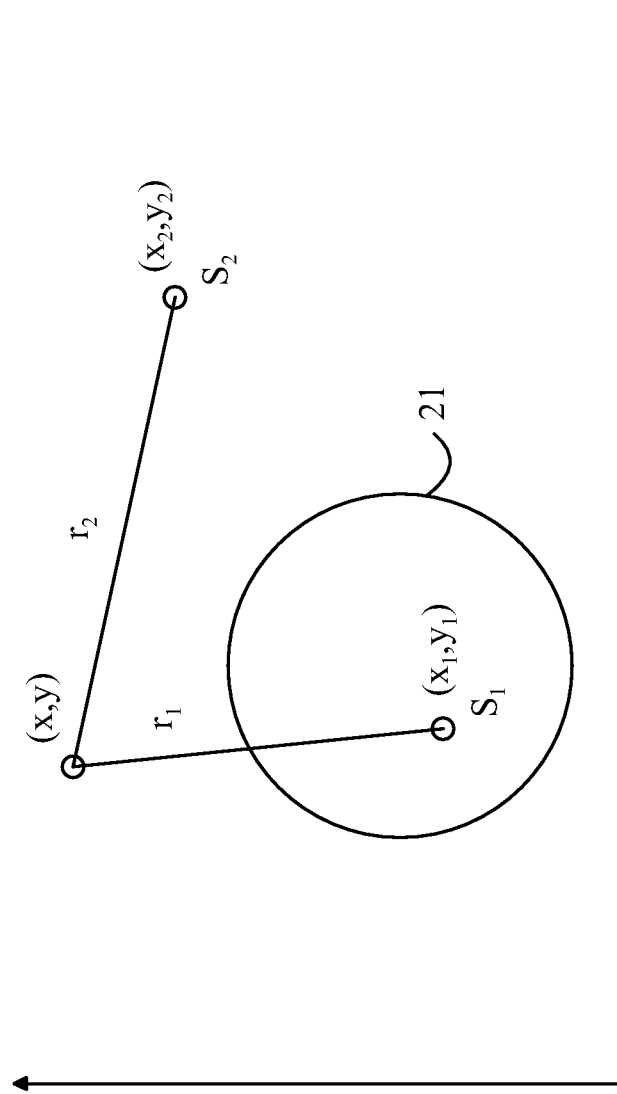
FIG. 2A is a graphical representation of the definition of a likelihood function according to one embodiment of the invention.

The present invention replaces the Circle of Apollonius by a likelihood function that is defined over the entire area of the field of view and that has the property that is peaked at the locations on the Circle of Apollonius. Refer now to FIG. 2A, which illustrates the manner in which the likelihood function is defined. The likelihood function is defined in terms of two receivers, $S_1$ and $S_2$. The ratio of the signal intensities received by an emitter at these two receivers defines a Circle of Apollonius 21. The likelihood function at a given point in the two-dimensional space is related to the probability that the emitter is located at that point given the fact that the receivers and emitters are less than perfect. If there were no errors, the likelihood function would be 1 on the Circle of Apollonius and zero for all other points.

In one aspect of the present invention, the likelihood function is defined in terms of an error function E(x,y) which is zero on the Circle of Apollonius and increases with the distance of (x,y) from the Circle of Apollonius. For example, consider the function $$E_{1,2}(x,y) = P_2 r_2^n - P_1 r_1^n \quad (3)$$

Figure 2B:
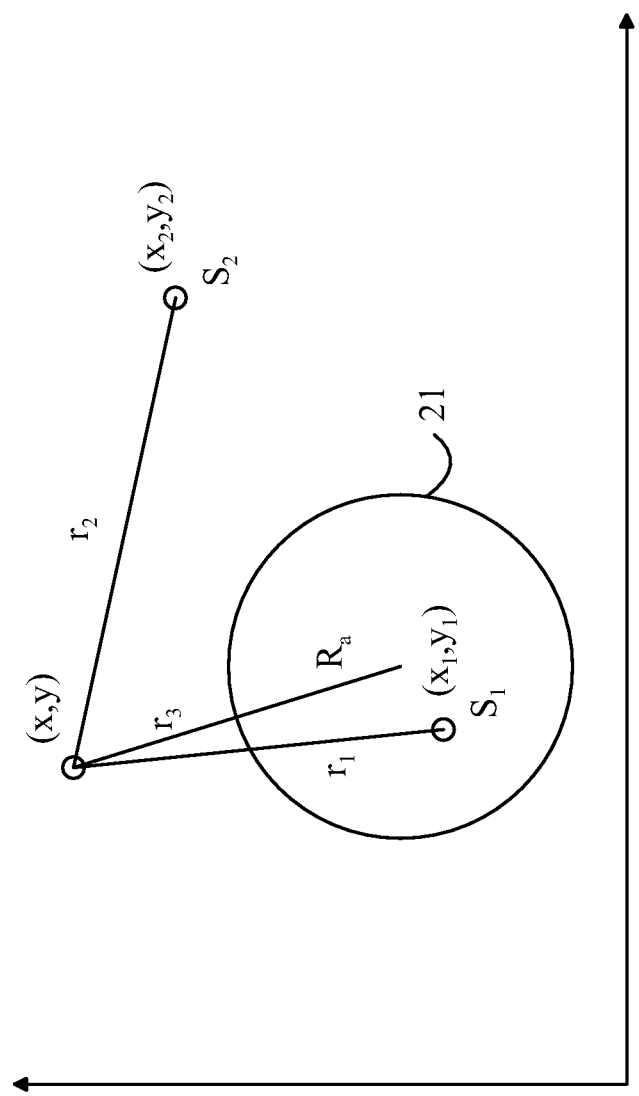
FIG. 2B is a graphical representation of the use of an error function according to another embodiment of the invention.

Here, $P_1$ and $P_2$ are the measured powers at receivers $S_1$ and $S_2$ when the emitter is located at (x,y). Since Eq.(2) is satisfied for all points on the Circle of Apollonius, $E_{1,2}(x,y)=0$ on the Circle of Apollonius as defined by the two receivers. For points off of the Circle of Apollonius, $|E_{1,2}(x,y)|$ will increase as the point moves further from the Circle of Apollonius. An alternative error function could be defined in terms of distance from the center of the Circle of Apollonius as shown in FIG. 2B. In this case, $$E_{1,2}(x,y) = |R_a - r_3| \quad (4)$$

Here, $E_{1,2}(x,y)$ depends only on the distance from the Circle of Apollonius to (x,y).

Given an error function, the likelihood function is constructed such that the value of the likelihood function is maximum at those locations at which the error function is zero, i.e., on the Circle of Apollonius in the case of a relative signal strength system, and decreases as the error function increases. For example, a likelihood function of the form $$\Gamma_{1,2}(x,y) = \frac{1}{\sigma\sqrt{2\pi}} e^{-E_{1,2}^2(x,y)/(\sigma^2\sqrt{2\pi})} \quad (5)$$

could be utilized. Here, σ blurs the likelihood function in a manner that depends on the uncertainty of the measurements at the two receivers. For example, σ could be a function of the signal-to-noise ratio in $P_1/P_2$. Larger signal-to-noise ratios reflect a smaller uncertainty in the power measurements, and hence, a smaller value of σ.

The likelihood function for any given pair of receivers may be viewed as a gray level image in the plane of the emitter and receivers. In the case of the likelihood function defined by Eqs. (4) and (5), the image is a blurred annulus having its maximum gray level on the Circle of Apollonius. One such likelihood function can be defined for each possible pairing of the receivers. These likelihood functions can then be combined to provide a gray-level image, $\Gamma_{total}(x,y)$, that displays the most likely location of the emitter. Alternatively, a color image in which different component likelihood functions are displayed in different colors with different intensities can also be constructed.

The simplest method for combining the likelihood functions is merely to sum the likelihood functions for each pair of receivers, namely $$\Gamma_{total}(x,y) = \sum_{i,j} \Gamma_{i,j}(x,y) \quad (6)$$

Figure 3:
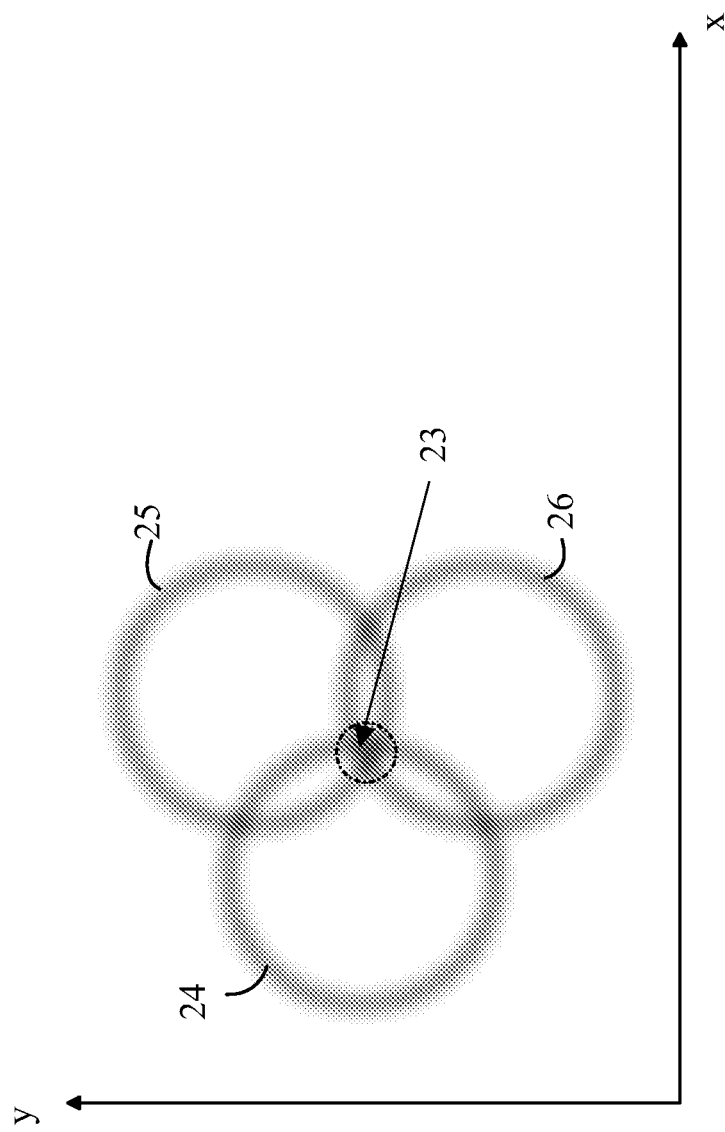
FIG. 3 is a graphical representation of the use of likelihood functions according to one embodiment of the invention.

Here, the sum is performed for all values of i≠j. Refer now to FIG. 3, which illustrates the summed likelihood functions obtained with three receivers. Each pair of receivers defines one likelihood function that may be viewed as a blurred annulus having a cross-section that is a Gaussian in the case of the likelihood function defined by Eq. (5) discussed above. The three likelihood functions are shown at 24-26, respectively. The area shown at 23 where the three likelihood functions overlap is the region of maximum likelihood and the predicted location of the emitter. The areas of higher likelihood are shown in white in the drawing.

Figure 4:
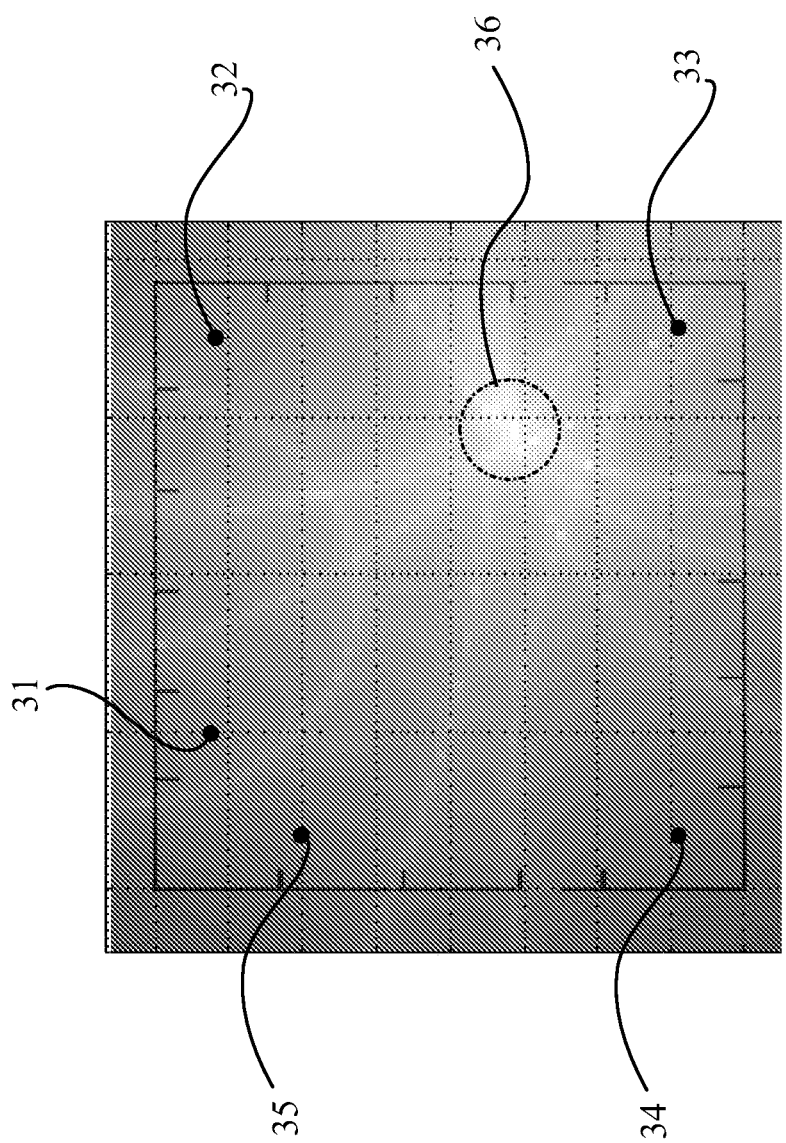
FIG. 4 is a graphical representation of the use of likelihood functions according to another embodiment of the invention.

A more complex combined likelihood function is shown in FIG. 4, which illustrates a field of view defined in terms of 5 receivers. The 5 receivers are shown at 31-35. The combined likelihood function is plotted with regions of largest magnitude shown in white. The region of maximum likelihood is shown at 36.

In general, the method for combining the individual likelihood functions can also include weighting factors that depend on both the receiver pair in question and the location (x,y). For example, $$\Gamma_{total}(x,y) = \sum_{i,j} \Phi_{i,j}(x,y) \Gamma_{i,j}(x,y) \quad (7)$$

Here, $\Phi_{i,j}(x,y)$ is a weighting function that depends on the specific pair of receivers and the position $(x,y)$ in the field of view of the receivers. In one embodiment, $$\Phi_{i,j}(x,y) = SNR_i SNR_j \Phi(x,y) \quad (8)$$

where $SNR_i$, and $SNR_j$ are the signal-to-noise ratios associated with the reception of the signal at the $i^{th}$ and $j^{th}$ receivers, respectively, and $\Phi(x,y)$ is related to the error contribution from the geometric arrangement in the field of view. $\Phi(x,y)$ is commonly referred to as the Geometric Dilution of Precision. It should be noted that the signal-to-noise ratios could also be a function of $(x,y)$. The signal-to-noise ratios can be measured for any arrangement of receivers by utilizing a receiver of known power that is moved within the field of view of the receivers. For each position in a grid of positions within the field of view, the signal-to-noise ratio is measured. It also should be noted that the signal-to-noise ratios can also be a function of power of the emitter. This dependence could also be measured and used in the combining function by repeating the signal-to-noise ratio measurements with the emitter set to different power levels. In addition, one can estimate the SNR of a given sensor pair using cross correlation methods. Cross-correlation methods will be discussed in more detail below. For the purpose of the present discussion, it is sufficient to note that the ratio of the cross correlation peak value to the average value is an indication of the measurement SNR.

Refer again to Eq. (5). The likelihood function depends on the parameter $\sigma$. In addition, the likelihood function depends on the value of n in the error function. Both of these parameters could be functions of $(x,y)$ as well as being functions of the particular pair of receivers. In the case of n, the parameter could also depend on the particular receiver, i.e., $n=n_i(x,y)$ for the $i^{th}$ receiver. These functions can be written in terms of parameters that can be optimized to provide the best performance for the combined likelihood function. The parameters can be optimized by fitting data for a known emitter at various known positions in the field of view of the receivers.

The embodiments discussed above utilize the Gaussian likelihood function of Eq. (5); however, other forms of likelihood function could also be utilized. For example, a likelihood function of the form $1/E^2_{i,j}(x,y)$ could be utilized at locations off of the Circle of Apollonius. It should be noted that this function has a singularity on the Circle of Apollonius. This problem can be avoided by defining $\Gamma_{i,j}(x,y)$ to be the minimum of $\Gamma_{max}$ and $\Gamma_{i,j}(x,y)$, where $\Gamma_{max}$ is a constant. Hence, this likelihood function will have its maximum value of the Circle of Apollonius and in regions adjacent to the circle and fall off in value as $(x,y)$ moves further from the Circle of Apollonius.

The above-described embodiments assume that the power of the signal from the emitter can be detected at each of the receivers. However, the signal could be buried in the noise at one or more receivers that are far from the emitter. In one aspect of the present invention, the power measurements needed from two receivers are derived from time correlation data computed from the receivers at three stations that include the two receivers in question. Denote the complex baseband voltage signal from the $k^{th}$ receiver as a function of time by $s_k(t)$. Consider the correlation of this signal with that generated from the $j^{th}$ receiver after the signals have been offset by some time difference $\Delta t$, i.e., $$R_{k,j}(\tau) = \int s_k^*(t) s_j(t+\tau) dt \quad (9)$$

The magnitude of $R_{k,j}$ will have a maximum at the $\tau$ value corresponding to the difference in the time of arrival of the signal from the emitter at the two receivers in question. The cross correlation may be complex valued, so the maximum is defined by the maximum value of the magnitude, $|R_{x,y}|$, or power, $|R_{x,y}|^2$. This maximum is proportional to the product of the powers in the signals received by the $k^{th}$ and $j^{th}$ receivers, i.e., $P_k P_j$. Similarly, the maximum of $R_{k,i}(\tau)$ is proportional to $P_k P_i$. Hence, the ratio of the maxima of $R_{k,i}$ and $R_{k,j}$ is the desired ratio, $P_i/P_j$. The advantage of this approach lies in the ability of the correlation data to extract the power levels even when the power levels are close to the noise floor.

The above-described error functions depend on the ratio of the power in signals received by two receivers. However, if the power of the emitter is known, embodiments that rely only on the measured power at each receiver could be implemented. The power from the emitter as measured at the $k^{th}$ receiver can be written in the form $$P_k = P_0 (r_k/d_k)^{-n} \quad (10)$$

where $P_0$ is the power from the emitter as measured by the $k^{th}$ receiver when $r_k=d_k$. Here, $d_k$ is a calibration distance. Hence, if $P_0$ is measured when the emitter is a distance $d_k$ from the $k^{th}$ receiver, Eq. (10) can be used to define an error function that only depends on one receiver. For example, $$E_k(x,y) = P_k - P_0 (r_k/d_k)^{-n} \quad (11)$$

The error function, $E_k(x,y)$, can then be used to construct a likelihood function for the emitter location as seen at the $k^{th}$ receiver by substituting $E_k(x,y)$ for the $E_{i,j}(x,y)$ discussed above. For example, a likelihood function, $\Gamma_j(x,y)$, can be defined in a manner analogous to that discussed above with respect to Eq. (5), namely, $$\Gamma_k(x,y) = \frac{1}{\sigma\sqrt{2\pi}} e^{-E_k^2(x,y)/(\sigma^2 \sqrt{2\pi})} \quad (12)$$

The likelihood functions for each of the receivers can then be combined to provide a composite likelihood function that can be displayed to determine the likely location for the emitter. For example, the composite likelihood function could be $$\Gamma_{total}(x,y) = \sum_j \Phi_j(x,y) \Gamma_j(x,y) \quad (13)$$

Here, $\Phi_j(x,y)$ is a weighting function that depends on the $j^{th}$ receiver. In one embodiment, $$\Phi_j(x,y) = SNR_j \Phi(x,y) \quad (14)$$

where $\Phi(x,y)$ is a Geometric Dilution of Precision function as described above.

The above-described embodiments utilize an RF emitter. However, other forms of emitters and receivers could be utilized provided the receivers can measure the power in the emitter signal at each receiver location. The emitter could be an ultrasound signal generator or an optical signal generator.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A system for displaying an emitter location, said system comprising:
   a plurality of receivers at different locations in a field in which said emitter is located, each receiver generating a receiver signal characterized by a signal magnitude that depends on a magnitude of a signal from said emitter; and
   a processor that receives said receiver signals and generates a likelihood map indicative of an approximation of a probability as a function of position in said field of said location, wherein said likelihood map comprises a plurality of receiver maps, each receiver map comprising a probability as a function of position in said field of said emitter location based on said signal magnitude for at least two of said receivers.

2. The system of claim 1 wherein each receiver map depends on a ratio of said signal magnitudes from a corresponding pair of said receivers.

3. The system of claim 2 wherein each ratio of said signal magnitudes is determined from cross-correlation functions generated from three of said receivers.

4. The system of claim 3 wherein each cross-correlation function comprises a cross-correlation of one of said signal magnitudes of said cross-correlation functions at a first one of said receivers as a function of time with a signal magnitude and phase as a function of time from a second one of said receivers offset in time with respect to said signal magnitude from said first one of said receivers.

5. The system of claim 4 wherein said offset in time is chosen to maximize said cross-correlation.

6. The system of claim 4 wherein multiple offsets in time are chosen to locally maximize the cross-correlation.

7. The system of claim 1 wherein said likelihood map comprises a weighted sum of said receiver maps.

8. The system of claim 7 wherein each receiver is characterized by a signal-to-noise ratio and wherein said weighted sum depends on said signal-to-noise ratios of said receivers.

9. The system of claim 7 wherein said weighted sum depends on a weighting function that varies as a function of position in said field.

10. The system of claim 1 further comprising a display on which said likelihood map is displayed.

11. A method for displaying a location of an emitter, said method comprising:
    providing a plurality of receivers at different locations in a field in which said emitter is located, each receiver generating a receiver signal characterized by a signal magnitude in response to a signal from said emitter;
    generating a likelihood map indicative of an approximation of a probability as a function of position in said field of said location, wherein said likelihood map comprises a plurality of receiver maps, each receiver map comprising a probability as a function of position in said field of said emitter location based on said signal magnitude for at least two of said receivers; and
    displaying said likelihood map.

12. The method of claim 11 wherein each receiver map depends on a ratio of said signal magnitudes from a corresponding pair of said receivers.

13. The method of claim 12 wherein each ratio of said signal magnitudes is determined from cross-correlation functions generated from three of said receivers.

14. The method of claim 13 wherein each cross-correlation function comprises a cross-correlation of one of said signal magnitudes and phases at a first one of said receivers as a function of time with a signal magnitude as a function of time from a second one of said receivers offset in time with respect to said signal from said first one of said receivers.

15. The method of claim 14 wherein said offset in time is chosen to maximize a magnitude of said cross-correlation.

16. The method of claim 11 wherein said likelihood map comprises a weighted sum of said receiver maps.

17. The method of claim 16 wherein each receiver is characterized by a signal-to-noise ratio and wherein said weighted sum depends on said signal-to-noise ratios of said receivers.

18. The method of claim 16 wherein said weighted sum depends on a weighting function that varies as a function of position in said field.

19. A non-transitory computer readable medium that stores a program that, when executed by a computer, causes said computer to display a location of an emitter, said program causing said computer to:
    process a plurality of receiver signals, each receiver signal characterized by a signal magnitude in response to a signal from said emitter;
    generate a likelihood map indicative of an approximation of a probability as a function of position in said field of said location, wherein said likelihood map comprises a plurality of receiver maps, each receiver map comprising a probability as a function of position in said field of said emitter location based on said signal magnitude for at least two of said receivers; and
    display said likelihood map.

* * * * *